United States Patent
Sato et al.

(10) Patent No.: US 11,450,929 B2
(45) Date of Patent: Sep. 20, 2022

(54) AUTOMOTIVE BUS BAR MODULE AND POWER SUPPLY DEVICE

(71) Applicant: Yazaki Corporation, Tokyo (JP)

(72) Inventors: Katsunori Sato, Kakegawa (JP); Shinichi Yanagihara, Kakegawa (JP); Takuto Goto, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 501 days.

(21) Appl. No.: 16/663,676

(22) Filed: Oct. 25, 2019

(65) Prior Publication Data
US 2020/0058917 A1 Feb. 20, 2020

Related U.S. Application Data

(63) Continuation of application No. PCT/JP2018/020867, filed on May 30, 2018.

(30) Foreign Application Priority Data

Jun. 8, 2017 (JP) .............................. JP2017-113537

(51) Int. Cl.
| | |
|---|---|
| H01M 50/502 | (2021.01) |
| H01M 10/48 | (2006.01) |
| H02G 3/04 | (2006.01) |
| H02G 3/38 | (2006.01) |
| H01M 50/20 | (2021.01) |

(52) U.S. Cl.
CPC ....... *H01M 50/502* (2021.01); *H01M 10/482* (2013.01); *H01M 50/20* (2021.01); *H02G 3/0437* (2013.01); *H02G 3/38* (2013.01); *H01M 2220/20* (2013.01)

(58) Field of Classification Search
CPC ..... H01M 50/50; H01M 50/502; H05K 7/209
USPC .......................................................... 439/627
See application file for complete search history.

(56) References Cited

U.S. PATENT DOCUMENTS

| | | | | |
|---|---|---|---|---|
| 5,252,091 A | * | 10/1993 | Fujita ..................... | H01R 25/14 |
| | | | | 439/499 |
| 5,643,693 A | * | 7/1997 | Hill ........................ | H01M 50/50 |
| | | | | 429/123 |
| 6,261,719 B1 | * | 7/2001 | Ikeda ..................... | H01R 11/288 |
| | | | | 429/177 |

(Continued)

FOREIGN PATENT DOCUMENTS

| | | |
|---|---|---|
| JP | 2014-233159 A | 12/2014 |
| JP | 2016-18741 A | 2/2016 |

*Primary Examiner* — Krystal Robinson
(74) *Attorney, Agent, or Firm* — Sughrue Mion, PLLC

(57) ABSTRACT

An automotive bus bar module includes a flat plate-shaped bus bar arranged to extend over electrodes of two adjacent unit batteries of a plurality of linearly arranged unit batteries of a battery assembly to electrically connect the electrodes to each other, a plurality of electric wires arranged to extend along an arrangement direction of the unit batteries, one of the plurality of electric wires being connected to the bus bar and an electric wire holding plate made of resin and arranged to extend over an upper surface of the bus bar, the electric wire holding plate holding the plurality of electric wires in a state of being parallel to each other and arranged planarly such that the plurality of electric wires extend along the arrangement direction of the unit batteries.

7 Claims, 9 Drawing Sheets

(56) References Cited

U.S. PATENT DOCUMENTS

| | | | | |
|---|---|---|---|---|
| 6,346,011 | B1* | 2/2002 | Ikeda | H01R 11/288 |
| | | | | 439/627 |
| 8,426,056 | B2* | 4/2013 | Ikeda | H01M 50/20 |
| | | | | 429/158 |
| 9,559,509 | B2* | 1/2017 | Nakamura | H02G 5/06 |
| 9,991,645 | B2* | 6/2018 | Fritz | H01M 50/502 |
| 10,056,588 | B2* | 8/2018 | Laderer | H01M 50/209 |
| 10,431,856 | B2* | 10/2019 | Fritz | H01M 10/425 |
| 2002/0098734 | A1* | 7/2002 | Ikeda | H01M 50/505 |
| | | | | 439/500 |
| 2010/0085015 | A1* | 4/2010 | Hamaguchi | H01M 10/484 |
| | | | | 320/134 |
| 2011/0064986 | A1* | 3/2011 | Ogasawara | H01M 50/502 |
| | | | | 174/68.2 |
| 2011/0135970 | A1* | 6/2011 | Han | H01M 50/502 |
| | | | | 429/7 |
| 2012/0323511 | A1* | 12/2012 | Saigo | H01M 10/486 |
| | | | | 702/63 |

* cited by examiner

AUTOMOTIVE BUS BAR MODULE AND POWER SUPPLY DEVICE

CROSS-REFERENCE TO RELATED APPLICATIONS

The present application is a continuation application of PCT/JP2018/020867 that claims priority to Japanese Patent Application No. 2017-113537 filed on Jun. 8, 2017, the entire contents of which are incorporated herein by reference.

TECHNICAL FIELD

The present invention relates to an automotive bus bar module of a power supply device used in a hybrid automobile, an electric automobile, or the like, and a power supply device including the bus bar module.

BACKGROUND

Various vehicles such as an electric automobile that runs using an electric motor and a hybrid automobile that runs using an engine and an electric motor together are mounted with a power supply device as a power source of the electric motor. This kind of power supply device includes a battery assembly (battery pack) in which a plurality of unit batteries having a positive pole (hereinafter referred to as "positive electrode") on one end and a negative pole (hereinafter referred to as "negative electrode") on the other end are linearly arranged such that the positive electrode and the negative electrode alternately adjoin each other. In the battery assembly, a related art bus bar module (see, e.g., JP2014-233159A) may be provided so as to be overlapped on a surface where electrodes are provided.

The bus bar module includes a plurality of bus bars, a plurality of voltage detection terminals, a plurality of voltage detection wires, and a resin case. The plurality of bus bars electrically connect the positive electrode and the negative electrode of the adjacent unit batteries of the battery assembly such that a plurality of unit batteries are connected in series. Each of the bus bars and the voltage detection terminals are generally fastened to the electrode using bolts or nuts. The voltage detection wires are electrically connected to the electrodes of the unit batteries via the voltage detection terminals overlapped on the bus bars.

The resin case is provided with a bus bar storage portion that stores the bus bars and the voltage detection terminals, and an electric wire storage portion that stores the voltage detection wires. The electric wire storage portion is provided with gutter-shaped wiring grooves that store a plurality of electric wires in a loose bundle state. The electric wire storage portion is formed into a rectangular pipe box shape to store the plurality of electric wires in a loose bundle state. Since the electric wire storage portion is formed into the rectangular pipe box shape and it is necessary to fasten the bus bar or the like to the electrode mainly using bolts or nuts on the upper surface of the unit batteries, the electric wire storage portion is disposed beside the bus bar storage portion.

As described above, in the related art bus bar module, the electric wire storage portion is disposed beside the bus bar (bus bar storage portion). Therefore, the size of the bus bar module tend to be large and the extent of downsizing is limited.

SUMMARY

The present invention has been made in view of the above-described circumstances, and an object thereof is to provide an automotive bus bar module having a compact structure and a power supply device using the bus bar module.

In order to achieve the above object, the automotive bus bar module and the power supply device according to the present invention have configurations of the following (1) to (7).

(1) An automotive bus bar module including:

a flat plate-shaped bus bar arranged to extend over electrodes of two adjacent unit batteries of a plurality of linearly arranged unit batteries of a battery assembly to electrically connect the electrodes to each other;

a plurality of electric wires arranged to extend along an arrangement direction of the unit batteries, one of the plurality of electric wires being connected to the bus bar; and an electric wire holding plate made of resin and arranged to extend over an upper surface of the bus bar, the electric wire holding plate holding the plurality of electric wires in a state of being parallel to each other and arranged planarly such that the plurality of electric wires extend along the arrangement direction of the unit batteries.

(2) The automotive bus bar module according to the above (1), in which the electric wire holding plate has a double-plate structure having a first plate and a second plate to planarly arrange and hold the plurality of electric wires between the first plate and the second plate, and the electric wire holding plate including a plurality of wiring grooves configured to guide the plurality of electric wires between mating surfaces of the first plate and the second plate, and an electric wire guiding portion configured to guide the one of the plurality of electric wires toward the bus bar to connect the one of the plurality of electric wires to the bus bar, (3) The automotive bus bar module according to the above (2), in which the first plate and the second plate are rotatably coupled to each other at side edges of the first and second plates along an alignment direction of the wiring grooves by a hinge, such that the mating surfaces of the first and second plates can be opened and closed.

(4) The automotive bus bar module according to the above (3), in which the wiring grooves are formed on the mating surface of the first plate facing the second plate, an auxiliary plate is integrally connected to a side edge of the first plate on an opposite side of the hinge via a second hinge, and the electric wire guiding portion is provided on the first plate and the auxiliary plate in a vicinity of the second hinge.

(5) The automotive bus bar module according to any one of the above (1) to (4), in which the electric wire holding plate includes an engaging portion configured to engage with the bus bar to fix the electric wire holding plate to the bus bar when the electric wire holding plate is placed over the upper surface of the bus bar.

(6) The automotive bus bar module according to any one of the above (1) to (5), in which the bus bar is configured to be welded to the electrodes from above the bus bar in a state of being overlapped on the electrodes of the unit batteries having flat upper surfaces.

(7) A power supply device including:

a battery assembly having a plurality of linearly arranged unit batteries; and a plurality of the automotive bus bar modules according to any one of the above (1) to (6) provided along an arrangement direction of the unit batteries being attached to the battery assembly in an overlapping manner, and the automotive bus bar modules electrically connecting the unit batteries to each other such that the unit batteries are connected in series, in which a plurality of voltage detection wires extending in the arrangement direction of the unit batteries are provided as the plurality of electric wires for each of the plurality of automotive bus bar modules provided in the arrangement direction of the unit batteries, and the plurality of voltage detection wires are retained by an electric wire holding plate of each of the automotive bus bar modules, and each of the voltage detection wires is connected, one by one in order, to the bus bar of a corresponding one of the automotive bus bar modules.

According to the automotive bus bar module having the configuration described above (1), the electric wire holding plate that holds the plurality of electric wires in a state of being arranged planarly is overlapped on the upper surface of the bus bar having a planar shape, therefore it is possible to reduce dimensions in the height direction and the width direction, thereby realizing downsizing of the bus bar module.

According to the automotive bus bar module having the configuration described above (2). The electric wire holding plate includes two fitted plates, and the wiring grooves are provided on the mating surface of the two plates. Therefore, it is possible to easily wire the plurality of electric wires parallel to each other and arranged planarly so as to extend along the arrangement direction of the unit batteries, and it is possible to certainly hold the plurality of electric wires in the state. Further, each of the plurality of electric wires to be connected to a corresponding bus bar can be easily guided toward the corresponding bus bar by the electric wire guiding portions.

According to the automotive bus bar module having the configuration described above (3), the first plate and the second plate are coupled by the hinge, such that the two plates can be fitted while being easily aligned with each other just by bending the hinge. In addition, since the first plate and the second plate are integrated, the number of components can be reduced.

According to the automotive bus bar module having the configuration described above (4), the wiring grooves are provided in the first plate, which serves as a base, the voltage detection wires are wired in the wiring grooves, and then the second plate, which serves as a lid, is overlapped, such that the plurality of electric wires can be held between the two plates. Then, one voltage detection wire connected to the corresponding bus bar can be guided by the electric wire guiding portions provided in the vicinity of the second hinge of the first plate and the auxiliary plate. Therefore, wiring of one electric wire out of the plurality of electric wires, the one electric wire is to be connected to the bus bar, can be completed by simple work.

According to the automotive bus bar module having the configuration described above (5), the electric wire holding plate can be easily fixed to the bus bar with the engaging portion of the electric wire holding plate by simply placing the electric wire holding plate holding the plurality of electric wires on the bus bar.

According to the automotive bus bar module having the configuration described above (6), the bus bar can be fixed to the electrodes only by welding the bus bar from above with the bus bar being overlapped on the electrodes of the unit batteries. Therefore, since the electric wire holding plate can be retained overlapped on the bus bar in a stable manner, the height dimension of an attached part of the bus bar module can be reduced to the minimum.

According to the power supply device having the configuration described above (7), the effects described above can be attained by using the automotive bus bar module having the configuration of any one of the above (1) to (6).

According to the present invention, it is possible to compact the automotive bus bar module and to simplify the attachment part of the bus bar module in the power supply device.

The present invention has been described briefly above. Further, details of the present invention will be clarified further by reading a mode for carrying out the invention (hereinafter, referred to as "embodiment") described below with reference to attached drawings.

DESCRIPTION OF EMBODIMENTS

Specific embodiments of the present invention will be described below with reference to the drawings.

Figure 1:
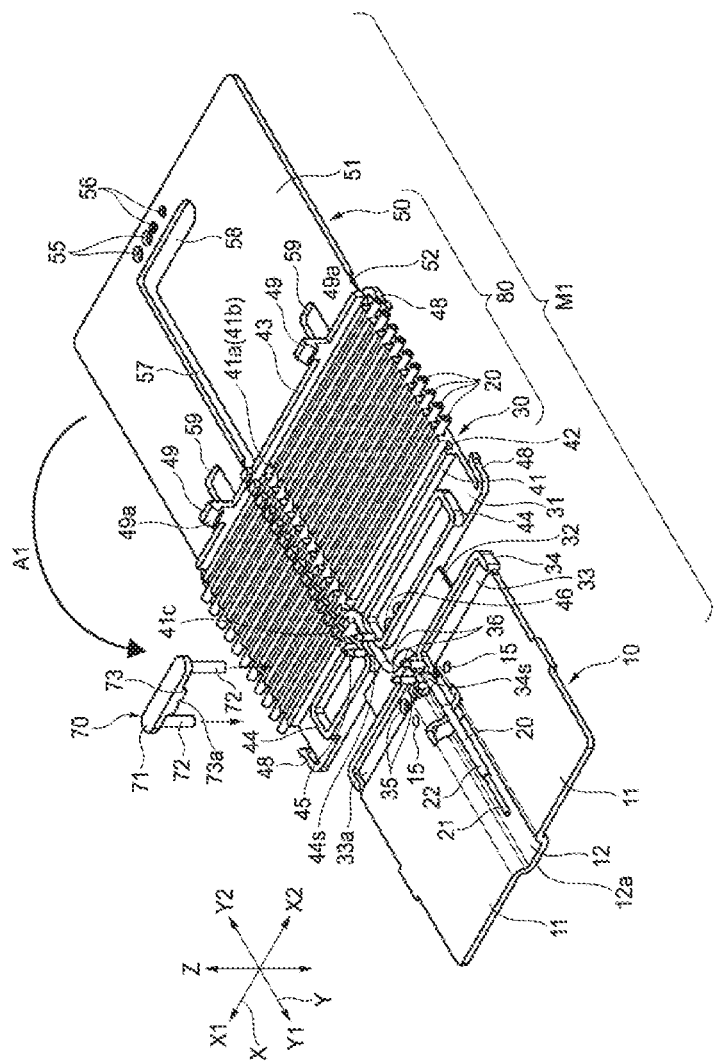
FIG. 1 is a perspective view showing a state before assembly of an automotive bus bar module according to an embodiment of the present invention.
Figure 2:
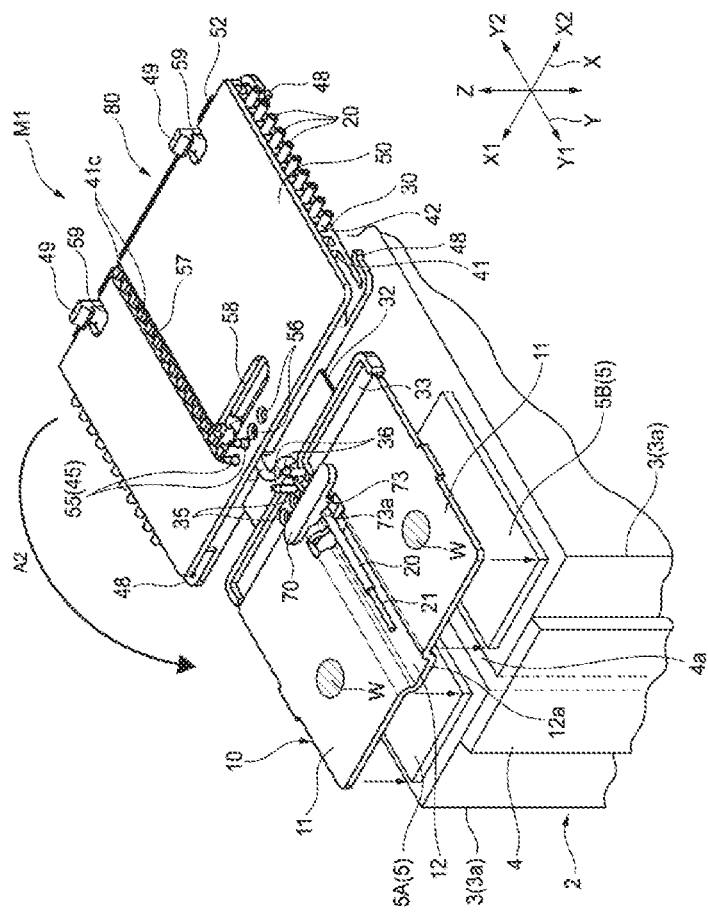
FIG. 2 is a perspective view showing a state during assembly of the automotive bus bar module according to the embodiment of the present invention to unit batteries.
Figure 3:
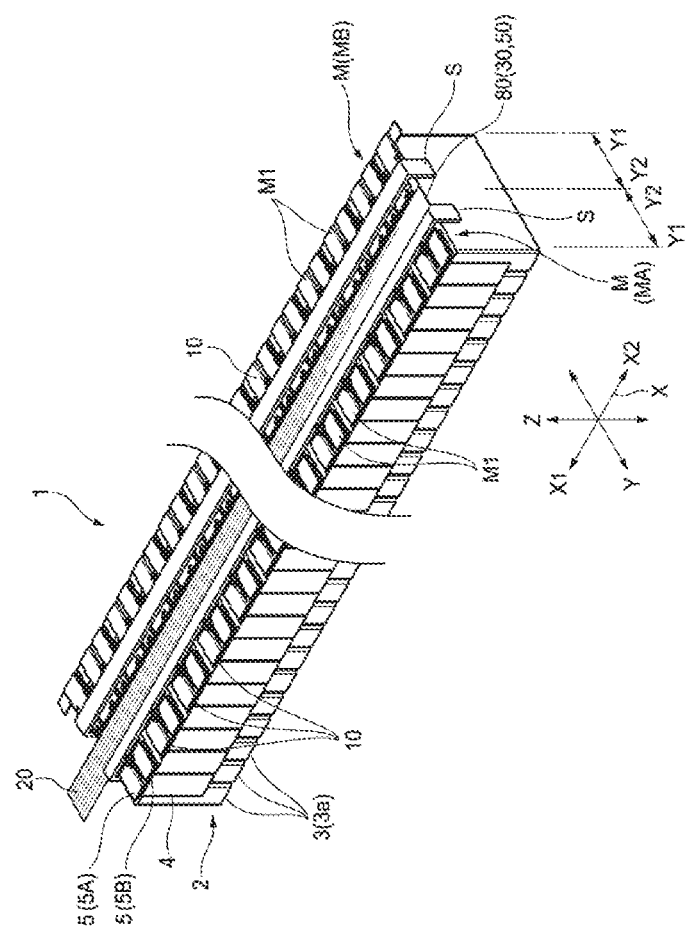
FIG. 3 is a perspective view showing a state in which a plurality of automotive bus bar modules in the state of FIG. 2 are arranged on a battery assembly.
Figure 4:
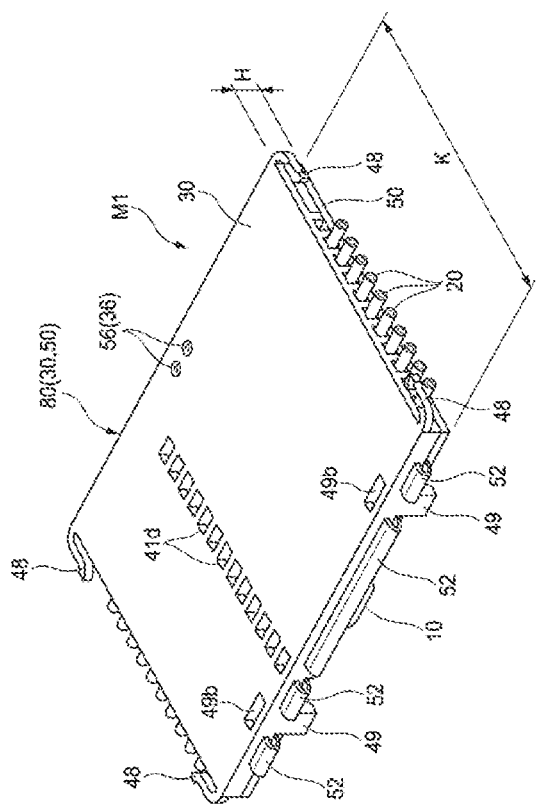
FIG. 4 is a perspective view showing a state of the automotive bus bar module according to the embodiment of the present invention assembled to the unit batteries (not shown)
Figure 5:
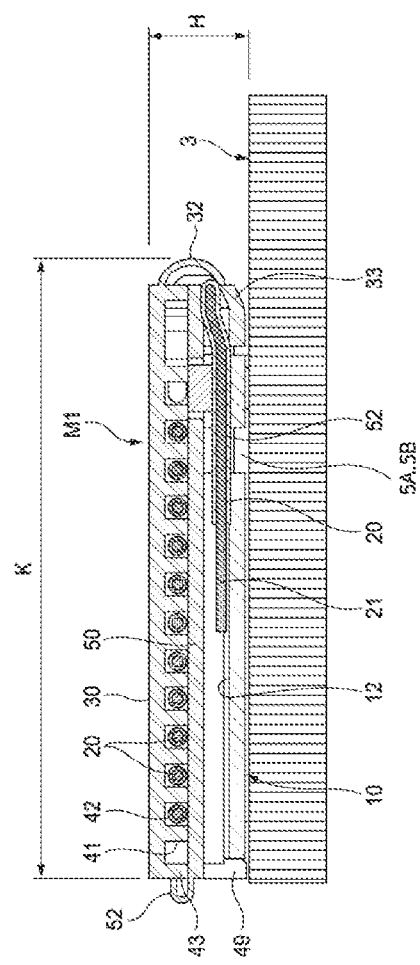
FIG. 5 is a cross-sectional view showing a state of the automotive bus bar module according to the embodiment of the present invention assembled to the unit batteries.
Figure 6:
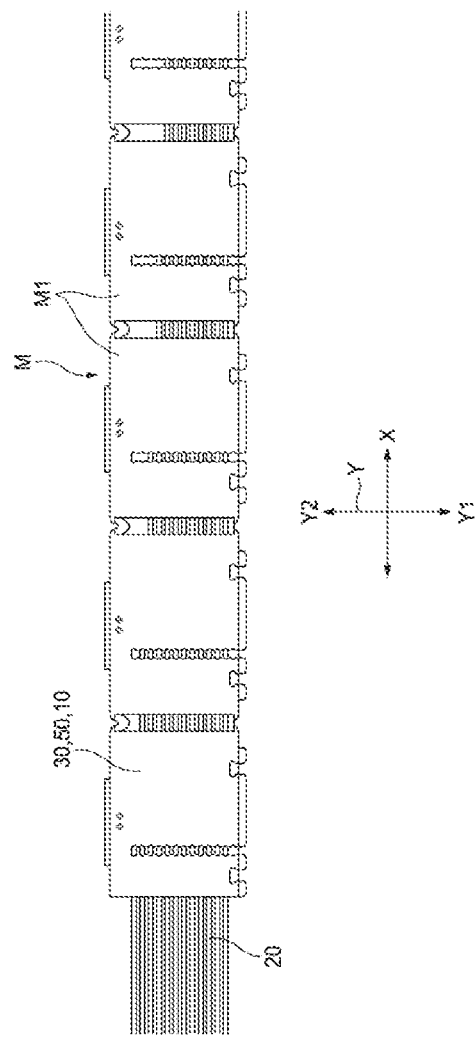
FIG. 6 is a plan view seen from top showing a state in which a plurality of automotive bus bar modules in the state of FIG. 5 are arranged on the battery assembly.

FIG. 1 is a perspective view showing a state before assembly of an automotive bus bar module according to an embodiment. FIG. 2 is a perspective view showing a state during assembly of the automotive bus bar module to unit batteries. FIG. 3 is a perspective view showing a state in which a plurality of automotive bus bar modules in the state of FIG. 2 are arranged on a battery assembly. FIG. 4 is a perspective view showing a state of the automotive bus bar module assembled to the unit batteries (not shown). FIG. 5 is a cross-sectional view showing a state of the automotive bus bar module assembled to the unit batteries. FIG. 6 is a plan view seen from top showing a state in which a plurality of automotive bus bar modules in the state of FIG. 5 are arranged on the battery assembly.

For convenience of description, an arrow X, an arrow Y, and an arrow Z are used to indicate arrangement directions or the like of each member. The arrow X, arrow Y, and arrow Z are orthogonal to each other. As will be described later, an X direction corresponds to an arrangement direction of the unit batteries, a Y direction corresponds to a direction in which positive and negative electrodes of the unit batteries are arranged, and a Z direction corresponds to a vertical direction.

First, a schematic configuration of a power supply device will be described. As shown in FIG. 3, the power supply device 1 includes a battery assembly 2 and a bus bar module unit M that is to be attached by being overlapped on an upper portion of the battery assembly 2. The bus bar module unit M is configured by arranging a plurality of automotive bus bar modules M1 in a row. The plurality of automotive bus bar modules M1 may be disposed adjacently to each other in an overlapped manner as necessary, or may be simply in adjacent contact with each other or simply disposed in a row. The bus bar module unit M is configured by arranging a necessary number of the automotive bus bar modules M1 in a row.

The power supply device 1 is to be mounted on an electric automobile that runs using an electric motor, a hybrid automobile that runs using an engine and an electric motor in combination, and the like, and supplies power to the electric motor.

The battery assembly 2 includes a plurality of unit batteries 3 that are arranged in a row along one direction (X direction) and fixed to each other. As shown in FIG. 2, an insertion plate portion 4a of a spacer 4 having a T-shaped cross section is inserted between side surfaces of battery bodies 3a of the adjacent unit batteries 3. By virtue of the spacer 4, positioning of the adjacent unit batteries 3 is performed, and a gap for ventilation is secured between the adjacent unit batteries 3. Each unit battery 3 includes a pair of electrodes 5 (5A, 5B) at each of one end and the other end in the Y direction of an rectangular upper surface of battery body 3a.

As shown in FIG. 2, the pair of electrodes 5 (5A, 5B) are flat plate-shaped electrodes having the same shape and size, and protrude upward slightly from the upper surface of the battery body 3a. One electrode of the pair of electrodes 5 (5A, 5B) is a positive electrode 5A, and the other electrode is a negative electrode 5B. Each unit battery 3 is arranged such that surfaces (upper surfaces) from which the pair of electrodes 5A and 5B protrude face upward. In addition, the positive electrode 5A of one unit battery 3 and the negative electrode 5B of the adjacent unit battery 3 to the one unit battery 3 are alternately arranged so as to adjoin each other. Therefore, the positive electrode 5A and the negative electrode 5B of each of the unit batteries 3 are alternately arranged along the X direction on one end side and the other end side in the Y direction.

As shown in FIG. 3, the bus bar module unit M connects a plurality of unit batteries 3 arranged in a row in series, and includes the automotive bus bar modules M1 of a number corresponding to the number of the arranged unit batteries 3. One automotive bus bar module M1 connects the electrodes 5 of two adjoining unit batteries 3 to each other. Therefore, the automotive bus bar modules M1 being used on one end side in the Y direction (for example, left side in FIG. 3) are half in number compared with the number of the unit batteries 3 being arranged. In addition, on the other end side in the Y direction (for example, right side in FIG. 3), the automotive bus bar modules M1 of a number which is obtained by subtracting 2 from the half of the number of the unit batteries 3 being arranged are being used. A terminal to be connected to a positive electrode of the entire power supply device 1 and a terminal to be connected to a negative electrode of the entire power supply device 1 will not be described here. The positive electrode is, for example, an electrode at one end in the arrangement direction of the unit batteries 3 on the other end side in the Y direction. The negative electrode is, for example, an electrode at the other end in the arrangement direction of the unit batteries 3 on the other end side in the Y direction.

Next, a configuration of the single automotive bus bar module M1 will be described with reference to FIG. 1 and FIG. 2. As shown in FIG. 1, the automotive bus bar module M1 includes a bus bar 10 made of a conductive metal having a flat plate shape, a plurality of voltage detection wires (electric wires) 20, and an electric wire holding plate 80 made of an insulating resin integrally molded. The flat plate-shaped bus bar 10 is disposed across the electrodes 5 (5A, 5B) of two adjacent unit batteries 3, and electrically connects the electrodes 5 (5A, 5B).

The plurality of voltage detection wires 20 are arranged so as to extend along the arrangement direction of the unit batteries 3, and tips thereof are connected to each one of the bus bar 10 of the automotive bus bar module M1 in order. The other end side of the voltage detection wire 20 is connected to a voltage detection circuit including an electronic control unit (ECU) (not shown). The ECU detects a remaining battery capacity, a charge/discharge state, or the like of each unit battery 3 based on a potential difference (voltage) between the pair of electrodes 5A and 5B in each unit battery 3 detected by the voltage detection circuit.

One voltage detection wire 20 is required for one automotive bus bar module M1, a plurality of which being arranged in one row along the X direction. Therefore, for a bus bar module unit M, the voltage detection wires 20 equal in number to the total number of the automotive bus bar modules M1 are present on base end sides of the voltage detection wires 20. Further, the voltage detection wires 20 are assigned one by one in order toward each of the automotive bus bar modules M1, staring from the automotive bus bar module M1 disposed closest to the base end sides of the voltage detection wires to the furthest one to the base end side. Therefore, the number of the voltage detection wires 20 decreases toward a tip side in the X direction in which the voltage detection wires 20 extend. That is, only one voltage detection wire 20 is to be wired to the automotive bus bar module M1 disposed farthest from the base end side.

The flat plate-shaped bus bar 10 and the electric wire holding plate 80 have sizes corresponding to the upper surfaces of the two unit batteries 3. However, the electric wire holding plate 80 is formed larger in plane size than the bus bar 10 in plane size. When being overlapped on the bus bar 10, the electric wire holding plate 80 completely covers the bus bar 10.

Next, the bus bar 10 will be described. The bus bar 10 is joined to the positive electrode 5A and the negative electrode 5B of two adjacent unit batteries 3 of the battery assembly 2, thereby connecting the unit batteries 3 in series. The bus bar 10 is obtained by pressing a conductive metal plate, or the like, and has two rectangular joint plate portions 11, 11 that are placed on the positive electrode 5A and the negative electrode 5B of the unit batteries 3 adjacent to each other. An electric wire insertion groove 12 in which one voltage detection wire 20 is to be passed, the voltage detection wire 20 to be connected to the bus bar 10, is provided on an upper surface of a portion between the two joint plate portions 11, 11. The electric wire insertion groove 12 has a depth dimension with which the voltage detection wire 20 does not protrude upward out of the groove when one voltage detection wire 20 is disposed and joined by soldering or welding.

The electric wire insertion groove 12 is formed by making a metal plate constituting the bus bar 10 recessed by pressing above. A lower surface of a portion where the electric wire insertion groove 12 is formed is a protrusion 12a having a trapezoidal-shape cross section. The protrusion 12a is to be fitted in an empty space between the positive electrode 5A and the negative electrode 5B when the two joint plate portions 11, 11 are placed on the upper surfaces of the positive electrode 5A and the negative electrode 5B. Thus, the protrusion 12a serves to position the bus bar 10 with respect to the positive electrode 5A and the negative electrode 5B.

The two joint plate portions 11, 11 of the bus bar 10 are to be placed on the upper surfaces of the positive electrode 5A and the negative electrode 5B of the unit batteries 3, and are to be welded from above the bus bar 10 in this state. A portion indicated with W in FIG. 2 indicates a welding position as an example. By welding, the bus bar 10 is mechanically joined to the positive electrode 5A and the negative electrode 5B of the unit batteries 3, and at the same time connects the positive electrode 5A and the negative electrode 5B electrically.

Here, a distinction between an outer side and an inner side of each bus bar module unit M (MA, MB) on one end side (for example, diagonally lower left side in FIG. 3) and the other end side (for example, diagonally upper right side in FIG. 3) of the power supply device 1 in the Y direction shown in FIG. 3 is described. For the bus bar module unit MA (M) on one end side, a side indicated by an arrow Y1 is the outer side, and a side indicated by an arrow Y2 is the inner side. Also for the bus bar module unit MB (M) on the other end side, a side indicated by the arrow Y1 is the outer side, and a side indicated the arrow Y2 side is the inner side. When each automotive bus bar module M1 of the bus bar module unit MA on the one end side and each automotive bus bar module M1 of the bus bar module unit MB on the other end side have the same shape, they are disposed in a point-symmetric manner. When a different shape is used, they are disposed in a line-symmetric manner. The electrodes 5 (5A, 5B) on the upper surface of each unit battery 3 are disposed at a position on a Y1 side (outward position).

For a distinction of an extending direction of the voltage detection wires 20 (X direction), a base end side (a side connected to ECU) in the extending direction of the voltage detection wires 20 is defined as an X1 side (diagonally upper left side in FIGS. 1 to 3), and a tip side is defined as an X2 side (diagonally lower right side in FIG. 1 to FIG. 3).

As shown in FIG. 1, the two joint plate portions 11, 11 of the bus bar 10 sandwich the electric wire insertion groove 12 and are disposed on both sides in the X direction. A tip of one voltage detection wire 20 is inserted from a Y2 side (inner side) into the electric wire insertion groove 12 of the bus bar 10. The voltage detection wire 20 is a coated electric wire, and a tip at which an insulation coating 22 is peeled off is to be inserted up to around the middle of the electric wire insertion groove 12 in a length direction. At that position, an exposed tip of a core wire conductor 21 is joined to an inner bottom surface of the electric wire insertion groove 12 of the bus bar 10 by soldering or welding.

Insertion holes 15 into which an electric wire fastener 70 is to be inserted to position and fix in a pressed manner the voltage detection wire 20 inserted into the electric wire insertion groove 12 are provided in the vicinity of an end of the bus bar 10 on a Y2 direction side (inner side). The electric wire fastener 70 is a resin molded small member, and includes a batten plate-shaped head portion 71 and a pressing protrusion 73 at a center of a bottom surface thereof. The electric wire fastener 70 has two insertion pins 72 protruding downward on both outer sides of the pressing protrusion 73 on a lower surface of the head portion 71. The pressing protrusion 73 is formed as a part to be fitted into the electric wire insertion groove 12 of the bus bar 10. A V groove 73a into which a part of the voltage detection wire 20 covered with the insulation coating 22 is to be fitted is formed on a center lower surface of the pressing protrusion 73.

The insertion holes 15 in the vicinity of the Y2 direction side (inner side) of the bus bar 10 is a through hole into which the insertion pins 72 of the electric wire fastener 70 is inserted. The insertion holes 15 are provided on both sides of the electric wire insertion groove 12 in the X direction, corresponding to positions of the two insertion pins 72 of the electric wire fastener 70.

Next, the electric wire holding plate 80 will be described. The electric wire holding plate 80 made of an integrally molded product of an electrically insulating resin is overlapped on the upper surface of the bus bar 10. The electric wire holding plate 80 serves to hold the plurality of voltage detection wires 20 parallel to each other and arranged planarly so as to extend along the arrangement direction (X direction) of the unit batteries 3. For the bus bar module M located at the most tip side of the voltage detection wire 20, only one voltage detection wire 20 is to be wired.

The electric wire holding plate 80 is configured as two fitted plates that arrange and hold the plurality of voltage detection wires 20 planarly between a first plate 30 functioning as a substrate and a second plate 50 functioning as a middle lid. Each upper surface shown in FIG. 1 is mating surfaces of the first plate 30 and the second plate 50. A plurality of wiring grooves 42 that guide wiring of the plurality of voltage detection wires 20 respectively are provided on the mating surface of a plate main body 31 of the first plate 30 that functions as a substrate. The wiring grooves 42 are arranged in the Y direction, the number of wiring grooves 42 being equal to that of the voltage detection wires 20 to be wired, and extend in parallel with each other from one end to the other end in the X direction. By laying the voltage detection wires 20 one by one into each one of the wiring grooves 42, it is possible to wire the plurality of voltage detection wires 20 in an planarly aligned manner like a flat cable.

The wiring grooves 42 are provided between adjacent ribs 41, 41, with a plurality of protruding ribs 41 at regular intervals in the Y direction on the mating surface (upper surface in FIG. 1) of the plate main body 31 of the first plate 30. A cutout portion 41a in which the rib 41 is interrupted is provided at around the middle of each rib 41 in the X direction. Since the cutout portions 41a of the ribs 41 are arranged in a row in the Y direction, electric wire drawing grooves 41b in the Y direction orthogonal to the wiring grooves 42 extending in the X direction are formed on the plate main body 31. The electric wire drawing groove 41b is a groove for drawing out one voltage detection wire 20 wired in an predetermined wiring groove 42 toward a Y1 direction (outer side). The electric wire drawing groove 41b is disposed at a position relatively closer to the X1 side from a middle position of the plate main body 31 in the X direction.

An electric wire locking protrusion 41c for retaining the voltage detection wire 20 inserted into the wiring groove 42 is provided by protruding from the upper surface of each rib 41 forming the wiring groove 42 at a position closer to the X1 side than the wire drawing groove 41b. The electric wire locking protrusion 41c has a projection part (not shown)

protruding over the wiring groove 42. The plate main body 31 is provided with die cutting holes 41d (see FIG. 4) for molding the projection part of the electric wire locking protrusion 41c as necessary for resin molding. The die cutting hole 41d can also be used as a confirmation window that confirms whether the voltage detection wire 20 is inserted into the wiring groove 42.

In the first plate 30 and the second plate 50, side edges on one side (Y2 direction side) of the arranged wiring grooves 42 are rotatably coupled by a first hinge 52, such that the mating surfaces of the two plates 30 and 50 can be opened and closed. An end rib 43 similar to the rib 41 that forms the wiring groove 42 is provided at a side edge of the first hinge 52 of the first plate 30. A plurality of engaging claws (engaging portions) 49 are provided with intervals by protruding from the upper surface of the end rib 43. The engaging claws 49 are to be engaged with the side edges of the bus bar 10 to fix the electric wire holding plate 80 to the bus bar 10 when the electric wire holding plate 80 is placed on the upper surface of the bus bar 10. Therefore, claw portions 49a are provided at the tip of the engaging claws 49 to protrude inward (facing the Y direction). In order to mold the claw portions 49a, die cutting holes 49b (see FIG. 4) are provided in the plate main body 31. Further, escape holes 59 is provided such that the tip of the engaging claws 49 of the first plate 30 penetrate through the escape holes 59 when the first plate 30 and the second plate 50 are overlapped at the side edge of the first hinge 52 of the first plate 50.

An auxiliary plate 33 is rotatably connected to a side edge of the first plate 30 on a side opposite to the first hinge 52 (on the Y1 side) via a batten plate-shaped second hinge 32. As will be described later, a width of the second hinge 32 in the Y2 direction is set to a dimension that does not force one voltage detection wire 20, which is to be drawn out, to bend excessively when the first plate 30 is folded and overlapped over the auxiliary plate 33.

Two rectangular frame-shaped ribs 44, 44 are provided side by side in the X direction in the vicinity of the second hinge 32 on the mating surface (upper surface in FIG. 1) of the first plate 30. A height of the rectangular frame-shaped rib 44 is the same as a height of the rib 41 forming the wiring groove 42 described above. The two rectangular frame-shaped ribs 44, 44 are formed such that one long side is flush with a side end surface of the plate main body 31.

The two rectangular frame-shaped ribs 44, 44 are adjacent to each other having an extended line of the electric wire drawing groove 41b as a boundary therebetween, and an electric wire drawing space 44s at almost the same interval as the width of the electric wire drawing groove 41b is provided between the two rectangular frame-shaped ribs 44, 44. A pair of positioning pins 45, 45 as electric wire guiding portions are provided on upper surfaces of adjacent positions of the two rectangular frame-shaped ribs 44, 44 with an electric wire drawing space 44s interposed therebetween. The pair of positioning pins 45, 45, letting one voltage detection wire 20 run therebetween, serves to position the voltage detection wire 20 and hold the electric wire. Further, insertion holes 46 of positioning pins 36 on a side of the auxiliary plate 33, which is to be described later, are provided on the plate main body 31 located on an inner side of the rectangular frame-shaped rib 44 on the X2 side.

Further, elastic arms 48 are provided at both ends in the X direction of the plate main body 31 of the first plate 30 for both ends in the Y direction. The elastic arms 48 serves to absorb a position error between the automotive bus bar modules M1 by the elastic arms 48 contacting each other when the automotive bus bar modules M1 are disposed adjacently. It is also possible to couple the adjacent automotive bus bar modules M1 with the elastic arms 48.

The plate main body 51 of the second plate 50 is formed in the same size as the plate main body 31 of the first plate 30. The plate main body 51 of the second plate 50 is not provided with a protrusion such as the rib 41 of the first plate 30 and the rectangular frame-shaped rib 44, and the mating surface (upper surface in FIG. 1) of the plate main body 51 is formed as simply a plane. The plate main body 51 of the second plate 50 is provided with an escape groove 57 into which the electric wire locking protrusion 41c of the first plate 30 is to be inserted when the second plate 50 is overlapped on the first plate 30. The escape groove 57 into which the electric wire locking protrusion 41c is to be inserted extends in the Y direction, which is the arrangement direction of the electric wire locking protrusion 41c.

Further, the plate main body 51 of the second plate 50 is further provided with an escape groove 58 into which the head portion 71 of the electric wire fastener 70 is to be inserted when the electric wire holding plate 80 is overlapped on the bus bar 10. The escape groove 58 for the head portion 71 of the electric wire fastener 70 is disposed in the vicinity of the side edge farther from the first hinge 52. The two escape grooves 57 and 58 are formed continuously as L-shaped grooves.

Four insertion holes 55, 55, 56, 56 are provided in a row along the X direction in the vicinity of the side edge farther from the first hinge 52 of the plate main body 51 of the second plate 50. Two insertion holes 55, 55 close to the X1 side of the four are insertion holes for the positioning pins 45, 45 of the first plate 30. The two insertion holes 56, 56 close to the X2 side are insertion holes for the positioning pins 36, 36 of the auxiliary plates 33 to be described later.

The auxiliary plate 33 rotatably coupled to the plate main body 31 of the first plate 30 by the second hinge 32 is a batten plate-shaped plate having a smaller width in the Y direction than that in the X direction. The length of the auxiliary plate 33 in the X direction is set to be almost equal to the length of the bus bar 10 in the X direction. A side edge of the bus bar 10 on the Y2 side is positioned adjacent to a side edge of the auxiliary plate 33 on a side opposite to the second hinge 32. The bus bar 10 may be temporarily fixed to the auxiliary plate 33 or may not be temporarily fixed to the auxiliary plate 33 in a state of being positioned at the side edge of the auxiliary plate 33. When the bus bar 10 is temporarily fixed to the auxiliary plate 33, a temporary fixing piece or the like can be provided at an appropriate position of the auxiliary plate 33.

Two C frame-shaped ribs 34, 34 are provided by protruding from the upper surface of the plate main body 33a of the auxiliary plate 33 with corresponding dimensions in the X direction with the two joint plate portions 11, 11 of the bus bar 10. The C frame-shaped rib 34 is divided into two exactly at a middle position of the length in the X direction, and the two adjoin each other in a state in which an electric wire insertion space 34s that lets one voltage detection wire 20 pass therethrough is secured at a middle position of the two. A pair of positioning pins 36, 36 as electric wire guiding portions are provided on upper surfaces of adjacent positions of the two C frame-shaped ribs 34, 34 with the electric wire drawing space 34s interposed therebetween. The positioning pins 36, 36 serve to position the voltage detection wire 20 and hold the electric wire one voltage detection wire 20 passing therebetween. Further, insertion holes 35, 35 for the positioning pins 45, 45 on the auxiliary plate 30 is provided on the plate main body 33a located on an inner side of the C frame-shaped rib 34 on an X1 direction side. The C frame-shaped rib 34 is not formed at a side edge on the Y1 side where the bus bar 10 is positioned. Therefore, the C frame-shaped rib 34 has a C shape in a planar view.

Next, an assembly procedure of the automotive bus bar modules M1 and an assembly procedure of the automotive bus bar modules M1 onto the battery assembly 2 will be described. It should be noted that a procedure to be described below is an example, and other procedures may also be performed.

First, the required number of the electric wire holding plates 80, bus bars 10, and voltage detection wires 20 are to be prepared. Lengths of the voltage detection wires 20 are determined in advance according to the order. Then, the voltage detection wires 20 are to be assigned one by one in order to each of the automotive bus bar modules M1, to be arranged in a row.

Next, the plurality of voltage detection wires 20 are to be wired in the wiring grooves 42 of the electric wire holding plate 80 of each of the automotive bus bar modules M1 according to the assignment order. That is, as shown in FIG. 1, the first plate 30 and the second plate 50 are in an open state, and the voltage detection wires 20 are to be inserted in order into the wiring grooves 42 of the first plate 30 and to be wired in a row. At this time, one voltage detection wire 20 assigned to one of the automotive bus bar modules M1 is to be wired at a position closest to the second hinge 32.

Then, the voltage detection wire 20 is to be bent at the middle of the wiring groove 42 and is to be drawn out from the first plate 30 to the auxiliary plate 33 side while being passed in the electric wire drawing groove 41b and between the pair of positioning pins 45, 45. The voltage detection wire 20 drawn out to the auxiliary plate 33 side is to be passed between the pair of positioning pins 36, 36 of the auxiliary plate 33 while being bent into an L shape. In this way, a tip portion of one voltage detection wire 20 to be connected to the automotive bus bar module M1 can be drawn out while being positioned in the Y1 direction of the electric wire holding plate 80.

Meanwhile, a side edge of the bus bar 10 on the Y2 side is positioned at a side edge of the auxiliary plate 33 on the Y1 side. At this time, the bus bar 10 and the auxiliary plate 33 can be temporarily fixed as necessary. Then, the tip of the voltage detection wire 20 drawn out from the auxiliary plate 33 is to be laid into the electric wire insertion groove 12 of the bus bar 10. Further, two insertion pins 72 of the electric wire fastener 70 are inserted into the insertion holes 15 to sandwich the insulation coating 22 of the voltage detection wire 20 between the electric wire insertion groove 12 and the V groove 73a to retain the tip portion of the voltage detection wire 20. For the steps up until now, the voltage detection wires 20 are wired into the wiring grooves 42 of the electric wire holding plate 80, and then a tip portion of the voltage detection wires 20 is fixed by the electric wire fastener 70. Alternatively, the tip portion of the voltage detection wires 20 can be fixed by the electric wire fastener 70, and then the voltage detection wires 20 can be wired in the wiring grooves 42 of the electric wire holding plate 80.

In this state, as shown in FIG. 2, the first hinge 52 is to be bent, and the second plate 50 is to be overlapped, as an inner lid, on the upper surface of the first plate 30 to close the electric wire holding plate 80 (closing operation of arrow A1 in FIG. 1). At this time, the electric wire locking protrusion 41c of the first plate 30 is absorbed by the escape grooves 57 of the second plate 50. The positioning pins 45 of the first plate 30 are to be inserted into the insertion holes 55 of the second plate 50.

Next, as shown in FIG. 3, a row of all the automotive bus bar modules M1 is to be placed on the battery assembly 2. That is, the bus bar 10 of each automotive bus bar module M1 is to be positioned and placed so as to extend over the positive electrode 5A and the negative electrode 5B of the adjacent unit batteries 3. Then, the electric wire holding plate 80 in a state of being folded in two is to be retained with a holding jig S having a band shape.

In this state, as shown in FIG. 2, the two joint plate portions 11, 11 of the bus bar 10 are to be welded and fixed to the upper surfaces of the positive electrode 5A and the negative electrode 5B of the adjacent unit batteries 3. The tip of the core wire conductor 21 of the voltage detection wire 20 laid into the electric wire insertion groove 12 of the bus bar 10 is to be joined to the bus bar 10 by welding or soldering. The voltage detection wire 20 may be joined to the bus bar 10 at a stage before the automotive bus bar module M1 is placed on the battery assembly 2.

After the bus bar 10 is fixed to the unit batteries 3, as shown in FIG. 4 to FIG. 6, the second hinge 32 is to be bent to overlap the electric wire holding plate 80 on the bus bar 10 and the auxiliary plate 33 (closing operation of the arrow A2 in FIG. 2). At this time, the engaging claws 49 of the first plate 30 whose tips protrude from escape holes 59 of the second plate 50 engage with the side edges of the bus bar 10 on the Y1 side. Accordingly, the electric wire holding plate 80 is fixed to the bus bar 10 joined to the electrodes 5 of the unit batteries 3, and attachment of the automotive bus bar module M1 is completed. After the completion, the holding jig S may be removed.

When the electric wire holding plate 80 is overlapped on the bus bar 10 and the auxiliary plate 33 in this way, the positioning pins 45 of the first plate 30 are to be accommodated in the insertion holes 35 of the auxiliary plate 33. The positioning pins 36 of the auxiliary plate 33 pass through the insertion holes 46 of the first plate 30, and are accommodated in the insertion holes 56 of the second plate 50.

As described above, according to the automotive bus bar module M1 of the present embodiment, the electric wire holding plate 80 that holds the plurality of voltage detection wires (electric wires) 20 in a state of being arranged planarly can be overlapped on the upper surface of the bus bar 10 having a planar shape. Therefore, a dimension H in the height direction and a dimension K in the width direction can be reduced, and downsizing can be achieved.

Further, according to the automotive bus bar module M1 of the present embodiment, the electric wire holding plate 80 includes two fitted plates (the first plate 30 and the second plate 50), and the wiring grooves 42 are provided between the mating surfaces of the two plates. Therefore, it is possible to easily wire the plurality of voltage detection wires 20 in a state being parallel to each other and arranged planarly so as to extend along the arrangement direction of the unit batteries 3, and it is possible to retain the plurality of voltage detection wires 20 in the state. Further, the voltage detection wire 20 to be connected to the bus bar 10 can be easily guided toward the bus bar 10 by the positioning pins 45, 45, 36, 36 as the electric wire guiding portions. In addition, since the bus bar 10 can be joined to the unit batteries 3 in a state in which the second plate 50 is closed, wiring work of the voltage detection wires 20 and joining work of the unit batteries 3 can be performed completely separately.

According to the automotive bus bar module M1 of the present embodiment, the first plate 30 and the second plate 50 are coupled by the first hinge 52. Therefore, the two plates (the first plate 30 and the second plate 50) can be overlapped with each other while being easily aligned with each other just by bending the first hinge 52. In addition, since the first plate 30 and the second plate 50 can be integrated, the number of components can be reduced.

Further, according to the automotive bus bar module M1 of the present embodiment, the wiring grooves 42 are provided on the first plate 30, which serves as the substrate (main body), the voltage detection wires 20 are to be wired in the wiring grooves 42, and then the second plate 50 serving as a lid side (inner lid) is to be overlapped. Therefore, the plurality of voltage detection wires 20 can be held between the two plates (the first plate 30 and the second plate 50) without letting voltage detection wires 20 come out. In this state, one voltage detection wire 20 connected to the bus bar 10 can be guided by the positioning pins 36, 36 as the electric wire guiding portions provided in the vicinity of the second hinge 32 of the first plate 30 and the auxiliary plate 33. Therefore, wiring of one voltage detection wire 20 out of the plurality of voltage detection wires 20, the one voltage detection wire 20 is to be connected to the bus bar 10 can be completed by simple work.

According to the automotive bus bar module M1 of the present embodiment, the electric wire holding plate 80 can be easily fixed to the bus bar 10 by merely placing the electric wire holding plate 80 holding the plurality of voltage detection wires 20 on the bus bar 10 by the engaging claws (engaging portions) 49 of the electric wire holding plate 80.

According to the automotive bus bar module M1 of the present embodiment, the bus bar 10 can be fixed to the electrodes 5 only by welding the bus bar 10 from above the bus bar 10 overlapped on the electrodes 5 of the unit batteries 3. Therefore, since the electric wire holding plate 80 can be overlapped on the bus bar 10 in a stable manner, the height dimension H of the attachment part of the automotive bus bar module M1 can be reduced to the minimum.

According to the automotive bus bar module M1 of the present embodiment, the escape grooves 57, 58, the escape holes 59 and the insertion holes 35, 46, 55, 56 are provided so as to accommodate the projecting parts (insertion pins) when the plates are overlapped. Therefore, the height dimension at the time of overlapping can be reduced to the minimum.

Next, advantages of the present embodiment will be described below as compared to a comparative example. In the drawings showing the comparative example, the same constituent elements as in the present embodiment are denoted by the same reference numerals, and descriptions thereof are omitted.

Figure 7:
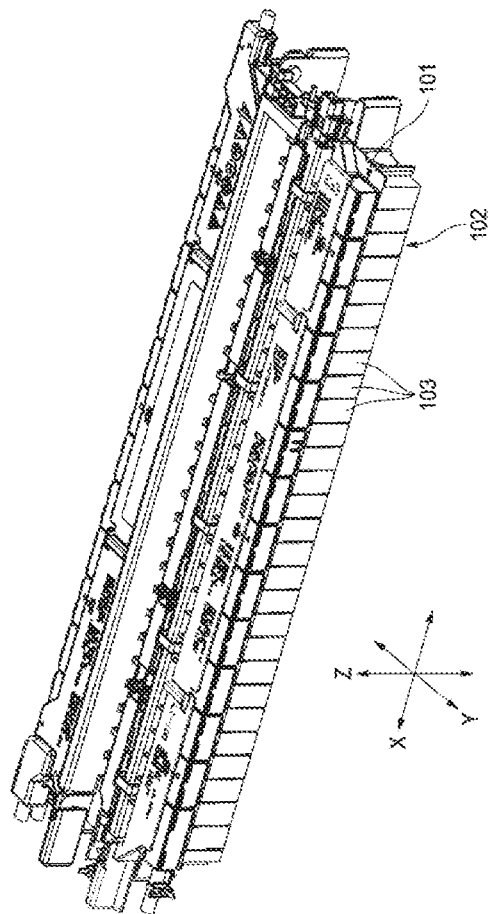
FIG. 7 is an external perspective view of a power supply device of a comparative example.

First, a bus bar module 101 shown as the comparative example will be described with reference to FIG. 7 to FIG. 9. FIG. 7 is an external perspective view of a power supply device of the comparative example, FIG. 8 is a plan view of the bus bar module 101 of the comparative example, and FIG. 9 is a cross-sectional view of electric wire storage portions 110 in the bus bar module 101 of the comparative example.

Figure 8:
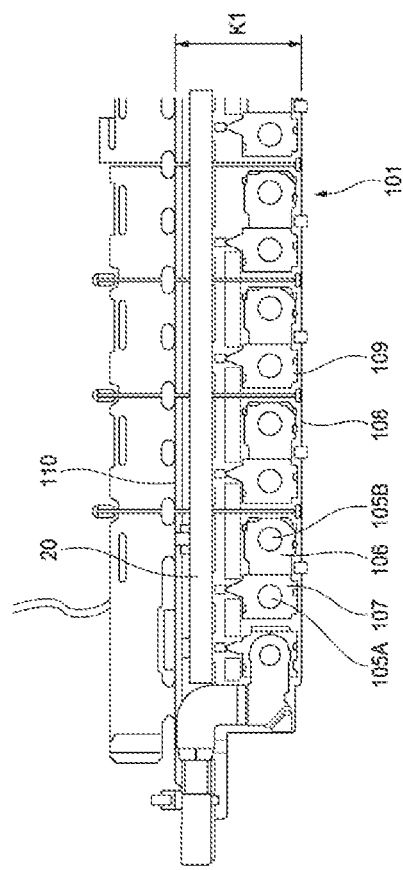
FIG. 8 is a plan view showing a configuration of a bus bar module of the power supply device of the comparative example.
Figure 9:
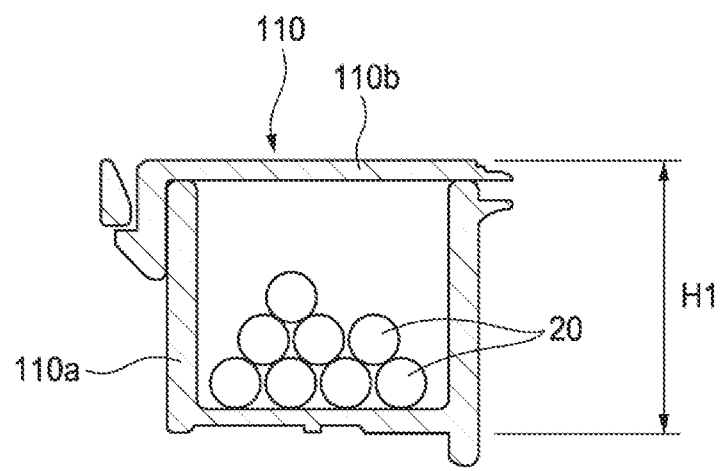
FIG. 9 is a cross-sectional view of electric wire storage portions in the bus bar module of the comparative example.

As shown in FIG. 7 and FIG. 8, a battery assembly 102 is formed by arranging a plurality of unit batteries 103 in a row. Cylindrical electrodes 105A, 105B are provided, protruding from an upper surface of each unit battery 103. The bus bar module 101 includes resin cases 108, bus bars 106 connecting each of the positive electrode 105A and the negative electrode 105B of the adjacent unit batteries 103, and voltage detection terminals 107 overlapped on the bus bars 106. The voltage detection terminals 107 are connected to the voltage detection wires 20 (see FIG. 9), respectively.

Bus bar storage portions 109 storing the bus bar 106 and the voltage detection terminal 107 in the resin case 108 and the electric wire storage portions 110 storing the voltage detection wires 20 are provided in the bus bar module 101 of the comparative example. The bus bar storage portions 109 and the electric wire storage portions 110 are arranged in a width direction (transverse direction) orthogonal to an arrangement direction of the unit batteries 103 of the battery assembly 102. The electric wire storage portion 110 is formed by hinge coupling of a lid 110b to a gutter-shaped main body portion 110a, and the voltage detection wires 20 are stored in a random bundle within the gutter-shaped main body portion 110a.

As described above, in the bus bar module 101 of the comparative example, a dimension K1 in the width direction increases since the voltage detection wires 20 are wired in the transverse direction of the bus bars 106. In addition, a height H1 in an attachment state of the bus bar module 101 easily increases since there is a height corresponding to the bus bar storage portion 109 or the electric wire storage portion 110 itself.

In contrast, according to the automotive bus bar module M1 of the present embodiment, as shown in FIG. 4 and FIG. 5, the height dimension H and the width dimension K can also be reduced, such that it is possible to downsize the attachment state to the battery assembly 2.

Here, configurations of the bus bar module and the power supply device of the embodiment according to the present invention described above will be briefly summarized and listed in the following [1] to [7] separately.

[1]

An automotive bus bar module (M1) including:

a flat plate-shaped bus bar (10) arranged to extend over electrodes (5A, 5B) of two adjacent unit batteries (3) of a plurality of linearly arranged unit batteries (3) of a battery assembly (2) to electrically connect the electrodes (5A, 5B) to each other;

a plurality of electric wires (voltage detection wires 20) arranged to extend along an arrangement direction of the unit batteries (3), one of the plurality of electric wires being connected to the bus bar; and an electric wire holding plate (80) made of resin and arranged to extend over an upper surface of the bus bar (10), the electric wire holding plate (80) holding the plurality of electric wires (voltage detection wires 20) in a state of being parallel to each other and arranged planarly such that the plurality of electric wires (voltage detection wires 20) extend along the arrangement direction of the unit batteries 3).

[2]

The automotive bus bar module (M1) according to the above [1], in which the electric wire holding plate (80) has a double-plate structure having a first plate (30) and a second plate (50) to planarly arrange and hold the plurality of electric wires (20) between the first plate (30) and the second plate (50), and the electric wire holding plate (80) including a plurality of wiring grooves (42) configured to guide the plurality of electric wires (20) between mating surfaces of the first plate (30) and the second plate (50), and an electric wire guiding portion (positioning pins 45, 36) configured to guide the one of the plurality of electric wires (20) toward the bus bar (10) to connect the one of the plurality of electric wires (20) to the bus bar (10).

[3]

The automotive bus bar module (M1) according to the above [2], in which the first plate (30) and the second plate (50) are rotatably coupled to each other at side edges of the first and second plates (30, 50) along an alignment direction of the wiring grooves (42) by a hinge (first hinge 52), such that the mating surfaces of the first and second plates (30, 50) can be opened and closed.

[4]

The automotive bus bar module (M1) according to the above [3], in which the wiring grooves (42) are formed on the mating surface of the first plate (30) facing the second plate (50), an auxiliary plate (33) is integrally connected to a side edge of the first plate (30) on an opposite side of the hinge (first hinge 52) via a second hinge (32), and the electric wire guiding portion (positioning pins 45, 36) is provided on the first plate (30) and the auxiliary plate (33) in a vicinity of the second hinge (32).

[5]

The automotive bus bar module (M1) according to any one of the above [1] to [4], in which the electric wire holding plate (80) includes an engaging portion (engaging claws 49) configured to engage with the bus bar (10) to fix the electric wire holding plate (80) to the bus bar (10) when the electric wire holding plate (80) is placed over the upper surface of the bus bar (10).

[6]

The automotive bus bar module (M1) according to any one of the above [1] to [5], in which the bus bar (10) is configured to be welded to the electrodes (5A, 5B) from above the bus bar (10) in a state of being overlapped on the electrodes (5A, 5B) of the unit batteries (3) having flat upper surfaces.

[7]

A power supply device (1) including:

a battery assembly (2) having a plurality of linearly arranged unit batteries (3); and a plurality of the automotive bus bar modules (M1) according to any one of the above [1] to [6] provided along an arrangement direction of the unit batteries (3), the automotive bus bar modules (M1) being attached to the battery assembly (2) in an overlapping manner, and the automotive bus bar modules (M1) electrically connecting the unit batteries (3) to each other such that the unit batteries (3) are connected in series, in which a plurality of voltage detection wires (20) extending in the arrangement direction of the unit batteries (3) are provided as the plurality of electric wires for each of the plurality of automotive bus bar modules (M1) provided in the arrangement direction of the unit batteries (3), and the plurality of voltage detection wires (20) are retained by an electric wire holding plate (80) of each of the automotive bus bar modules (M1), and each of the voltage detection wires (20) is connected, one by one in order, to the bus bar (10) of a corresponding one of the automotive bus bar modules (M1).

What is claimed is:

1. An automotive bus bar module comprising:
a flat plate-shaped bus bar arranged to extend over electrodes of two adjacent unit batteries of a plurality of linearly arranged unit batteries of a battery assembly to electrically connect the electrodes to each other;
a plurality of electric wires arranged to extend along an arrangement direction of the unit batteries, one of the plurality of electric wires being connected to the bus bar; and
an electric wire holding plate made of resin and arranged to extend over an upper surface of the bus bar, the electric wire holding plate holding the plurality of electric wires in a state of being parallel to each other and arranged planarly such that the plurality of electric wires extend along the arrangement direction of the unit batteries.

2. The automotive bus bar module according to claim 1, wherein the electric wire holding plate comprises:
a first plate;
a second plate;
a plurality of wiring grooves; and
an electric wire guiding portion,
wherein the first and second plates provide a double-plate structure configured to planarly arrange and hold the plurality of electric wires between the first and second plates,
wherein the plurality of wiring grooves are provided between mating surfaces of the first and second plates, the plurality of wiring grooves configured to guide the plurality of electric wires, and
wherein the electric wire guiding portion is configured to guide the one of the plurality of electric wires toward the bus bar to connect the one of the electric wires to the bus bar.

3. The automotive bus bar module according to claim 2, further comprising:
a first hinge,
wherein the first and second plates are rotatably coupled to each other by the first hinge at side edges of the first and second plates along an alignment direction of the wiring grooves such that the mating surfaces of the first and second plates can be opened and closed.

4. The automotive bus bar module according to claim 3, further comprising:
a second hinge provided on an side edge of the first plate on an opposite side of the first hinge, and
an auxiliary plate integrally connected to the side edge of the first plate on the opposite side of the first hinge via the second hinge,
wherein the wiring grooves are provided on the mating surface of the first plate facing the second plate, and
wherein the electric wire guiding portion is provided on the first plate and the auxiliary plate in a vicinity of the second hinge.

5. The automotive bus bar module according to claim 1, wherein the electric wire holding plate further comprises an engaging portion to engage with the bus bar to fix the electric wire holding plate to the bus bar when the electric wire holding plate is placed over the upper surface of the bus bar.

6. The automotive bus bar module according to claim 1, wherein the bus bar is configured to be welded to the electrodes from above the bus bar in a state of being overlapped on the electrodes of the unit batteries, having flat upper surfaces.

7. A power supply device comprising:
a battery assembly having a plurality of linearly arranged unit batteries; and
a plurality of automotive bus bar modules provided along an arrangement direction of the unit batteries, the automotive bus bar modules being attached to the battery assembly in an overlapping manner, and the automotive bus bar modules electrically connecting the unit batteries to each other such that the unit batteries are connected in series,
wherein the plurality of the automotive bus bar modules comprise:
a flat plate-shaped bus bar arranged to extend over electrodes of two adjacent unit batteries of the plurality of linearly arranged unit batteries of a battery assembly to electrically connect the electrodes to each other;

a plurality of electric wires arranged to extend along an arrangement direction of the unit batteries, one of the plurality of electric wires being connected to the bus bar; and an electric wire holding plate made of resin and arranged to extend over an upper surface of the bus bar, the electric wire holding plate holding the plurality of electric wires in a state of being parallel to each other and arranged planarly such that the plurality of electric wires extend along the arrangement direction of the unit batteries, wherein a plurality of voltage detection wires extending in the arrangement direction of the unit batteries are provided as the plurality of electric wires for each of the plurality of automotive bus bar modules provided in the arrangement direction of the unit batteries, the plurality of voltage detection wires being retained by an electric wire holding plate of each of the automotive bus bar modules, and wherein each one of the voltage detection wires is connected, one by one in order, to the bus bar of a corresponding one of the automotive bus bar modules.

* * * * *